United States Patent
Deveau et al.

[11] Patent Number: 6,102,581
[45] Date of Patent: Aug. 15, 2000

[54] OPTICAL ADAPTER INCLUDING A FERRULE ASSEMBLY

[75] Inventors: Mark G. Deveau, Canton; Norman Roger Lampert, Norcross, both of Ga.

[73] Assignee: Lucent Technologies Inc., Murray Hill, N.J.

[21] Appl. No.: 09/097,620

[22] Filed: Jun. 16, 1998

[51] Int. Cl.[7] ................................................. G02B 6/36
[52] U.S. Cl. ............................... 385/56; 385/60; 385/77; 385/78; 385/139; 385/140
[58] Field of Search .................................. 385/56, 58, 60, 385/70, 78, 86, 139, 140

[56] References Cited

U.S. PATENT DOCUMENTS

| | | | |
|---|---|---|---|
| 5,066,084 | 11/1991 | Takahashi | 385/73 |
| 5,082,345 | 1/1992 | Cammons et al. | 385/60 |
| 5,123,071 | 6/1992 | Mulholland et al. | 385/56 |
| 5,274,729 | 12/1993 | King et al. | 385/134 |
| 5,638,474 | 6/1997 | Lampert et al. | 385/78 |
| 5,647,043 | 7/1997 | Anderson et al. | 385/78 |
| 5,719,977 | 2/1998 | Lampert et al. | 385/60 |
| 5,828,804 | 10/1998 | Akins et al. | 385/70 |
| 5,923,805 | 7/1999 | Anderson et al. | 385/56 |

FOREIGN PATENT DOCUMENTS

| | | |
|---|---|---|
| 306243 | 8/1989 | European Pat. Off. . |
| 689069 | 12/1995 | European Pat. Off. . |
| 090150 | 4/1997 | Japan . |

OTHER PUBLICATIONS

"72 Series Singlemode Attenuators," Storm Products Company Product Brochure, Aug. 1992.
"71 Series Singlemode Adaptors," Storm Products Company Product Brochure, Aug. 1992.
"Attenuator," Sieko Instruments & Electronics Ltd. Product Brochure, No Publication Date Available.

*Primary Examiner*—Hemang Sanghavi

[57] ABSTRACT

An optical adapter 100 includes a pair of cylindrical ferrules 121, 122, each containing an optical fiber disposed along its central axis 101–101. The ferrules are aligned with their central axes being collinear. Moreover, the ferrules are captured within a plastic housing that comprises a plug member 110 and a jack member 140. These members interlock with each other to form an adapter that can be used, for example, for attenuating an optical signal or for interconnecting two ferrules having different diameters. Preferably, the ferrules are identical to each other. Each ferrule includes an optical fiber that is disposed in a bore, which extend s along the central axis of the ferrule between its opposite ends, and each ferrule has an end face 126 that is angled at about 82 degrees with respect to the central axis. In one embodiment, the angled end faces of the ferrules are in direct contact with each other and attenuation is determined by the optical path length between the centers of the angled end faces, which is a function of the axial rotation of the ferrules with respect to each other. In another embodiment, the angled end faces of the ferrules are in contact with opposite sides of a spacer 170 so that attenuation is a function of the spacer's thickness and the axial rotation of the ferrules with respect to each other. Such a design enables precision optical attenuators to be fabricated. Wavelength division multiplexing systems are improved by the use of such precision optical attenuators at the inputs of the multiplexer 200 and/or the outputs of the demultiplexer 500.

16 Claims, 7 Drawing Sheets

OPTICAL ADAPTER INCLUDING A FERRULE ASSEMBLY

CROSS REFERENCE TO RELATED APPLICATIONS

This invention is related to application Ser. No. 09/098,276 entitled Optical Air-Gap Attenuator, which is being filed concurrently with this patent application.

TECHNICAL FIELD

This invention relates to optical fiber connecting apparatus and, more particularly, to an adapter for interconnection between an optical plug connector and an optical jack connector.

BACKGROUND OF THE INVENTION

Fiber-optic telecommunication networks are constantly being upgraded to carry more and more channels over a single optical fiber. And while fiber manufacturers may not applaud this trend because it decreases the demand for optical fiber, it clearly signals the direction of this industry. Indeed, Lucent Technologies Inc. recently announced an optical system having over 100 channels, each transmitting 10 gigabits of data at a different wavelength, over a distance of nearly 250 miles (400 km) using its TrueWave® fiber. This represented the world's first long-distance, error-free transmission of a terabit (1 trillion bits) of information per second over a single strand of optical fiber. Associated with such multi-channel optical systems are wavelength division multiplexers (WDM), which operate to combine an number of separate and distinct wavelength regions (channels) onto a single optical fiber in one direction of transmission, and to separate them from the optical fiber in the other. This is to say that the WDM operates as multiplexer in one direction of transmission, and as a demultiplexer in the other. These channels each have a different central wavelength (i.e., $\lambda_1$, $\lambda_2$, ... $\lambda_n$) and, for optimum performance of the WDMs and associated transmitters and receivers, it is important that the optical signal power of each channel be precisely controlled, and preferably equal to all others.

It is desirable to have a common structure, which can be installed in individual ports of an optical multiplexer and/or an optical demultiplexer, and used to control the power level of optical signals. At one end, this structure would be shaped to fit into a jack connector as though it were a standard optical plug connector. At the other end, this structure would be shaped to receive a standard optical plug connector. Accordingly, whenever it is desirable to add attenuation (i.e., insertion loss), for example, to an optical path, this structure is interposed between a standard optical plug connector and a standard optical jack connector. Such a structure is referred to as an "optical adapter" herein.

Optical adapters exist that include attenuators, but they are somewhat expensive because they have an abundance of parts, many of them machined, and these parts must be manually assembled. Such adapters are presently available for use in connection with FC, SC and ST optical connectors. However, these adapters were developed when competitive cost pressures were minimal and customers would gladly pay any price to have them, which is no longer the situation.

A new optical connector, designated "LC," has been developed with a ferrule having a diameter that is only 1.25 mm, which is half the diameter of the above-mentioned FC, SC and ST connectors. More importantly, the LC connector uses a cantilever latch during interconnection with a mating connector in a manner similar to the modular plugs and jacks used in conventional telephone equipment. At the present time, there are no suitable adapters for use with LC connectors.

In addition to providing the attenuation function, the same adapter structure should accommodate other functions such as interconnecting ferrules of different sizes or interconnecting connectors of different styles.

Accordingly, what is desired is an optical adapter that can be used in various applications and to have a small number of parts so that it can be assembled with relative ease. Further, it is desirable for the adapter to work with LC-type connectors.

SUMMARY OF THE INVENTION

An optical adapter for interconnection between a plug connector and a jack connector includes a ferrule assembly and a housing. At its simplest, the ferrule assembly comprises a cylindrical ferrule having an optical fiber that extends between the front and back ends of the ferrule along its central axis. The housing merely comprises a plug member and a jack member, preferably molded from thermoplastic material, that interlock with each other and enclose the ferrule assembly. The jack member includes a cavity for receiving the plug connector while the plug member includes a cantilever latch and is designed to fit into the jack connector.

In an illustrative embodiment of the invention, the ferrule assembly is movable in the axial direction within the interlocked plug and jack members so that a spring-loaded ferrule, in a series connection of ferrules, will be able to close any unwanted air gaps between ferrules. Also in the illustrative embodiment, a portion of the ferrule assembly is surrounded by a barrel structure that is shaped to fit within the housing in only a limited number of stable axial rotations for tuning fiber eccentricity (i. e., situations wherein the optical fiber does not reside precisely on the central axis of the ferrule, and the ferrule assembly is rotated so that the fiber is always between the centroid of the ferrule and a reference position on the housing).

BRIEF DESCRIPTION OF THE DRAWING

The invention and its mode of operation will be more clearly understood from the following detailed description when read with the appended drawing in which.

DETAILED DESCRIPTION

Figure 1:
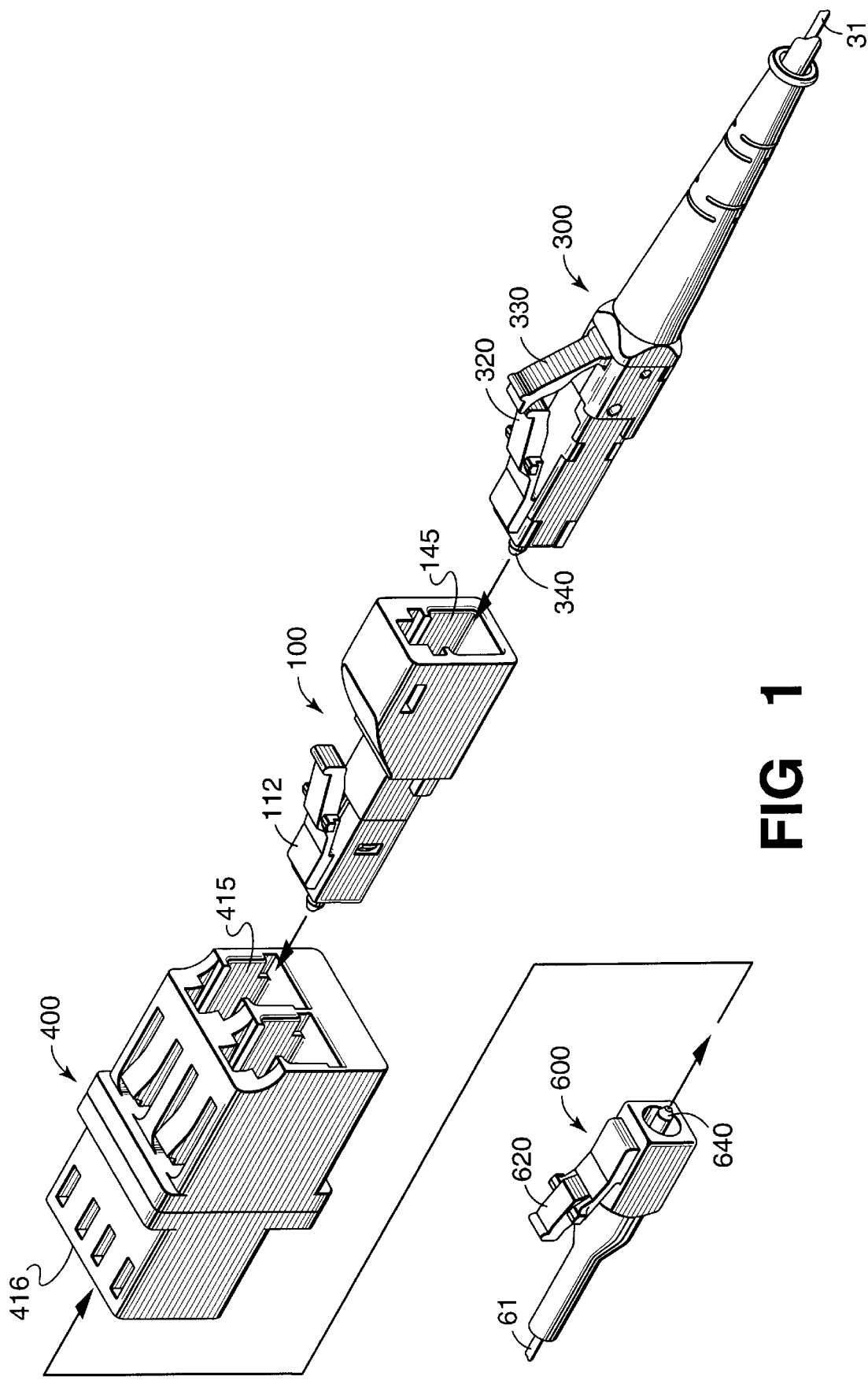
FIG. 1 is a perspective view of an interconnection system for optical fibers, the system includes an optical adapter having an attenuator housed therein.

FIG. 1 is a perspective view of an optical communication system, illustrating various components used for interconnecting a pair of optical fibers 61 and 31. Optical plug connector 600 includes a ferrule 640 that terminates an end portion of optical fiber 61. Illustratively, ferrule 640 can be floating or immovably held within the plug connector 600. An example of an immovably held ferrule is disclosed in U.S. Pat. No. 5,719,977. Plug connector 300 also includes a ferrule 340 that terminates an end portion of optical fiber 31. Illustratively, ferrule 340 is movably held within plug connector 300, which is disclosed in greater detail in U.S. Pat. No. 5,638,474. These plug connectors 300, 600 are adapted to be inserted into a jack connector 400 so that an end-to-end connection between optical fibers 61, 31 can be made. The design of jack connector 400 is disclosed in greater detail in U.S. Pat. No. 5,647,043. Each of the plug connectors 300, 600 includes a latch 320, 620 that is designed to cooperate with retaining ledges (not shown) within the cavities on opposite sides of jack connector 400 so that it can be securely held therein. Plug connector 300 includes a trigger 330, which provides an anti-snag feature and also renders latch 320 more accessible to users, particularly in a small connector. Additionally, plug connector 300 includes a spring 360 (see FIG. 4), which imparts a predetermined force (about 0.5 kgf) in the axial direction onto ferrule 340 so that it will press against ferrule 640 without an air gap. Air gaps are known to cause signal reflections and attenuation in an optical path. And while the present invention uses an air gap to achieve precise attenuation, unintended air gaps are to be avoided.

Nevertheless, in order to simplify the design of optical processing apparatus such as multiplexers and receivers, it is sometimes desirable to introduce attenuation into an optical signal path so that the processing apparatus will be processing optical signals at the most appropriate power level. Accordingly, FIG. 1 also shows an optical adapter 100 that is designed to provide a precise attenuation level. Advantageously, the adapter can be plugged into cavity 415—which accommodates plug connector 300, or the adapter can be plugged into cavity 416—which accommodates plug connector 600. Optical adapter 100 includes a latch 112 that cooperates with a retaining ledge (not shown) within cavities 415, 416 of jack connector 400 so that it can be securely held therein. The optical adapter further includes a cavity 145 for receiving plug connectors 300, 600.

Adapter Construction

Figure 2:
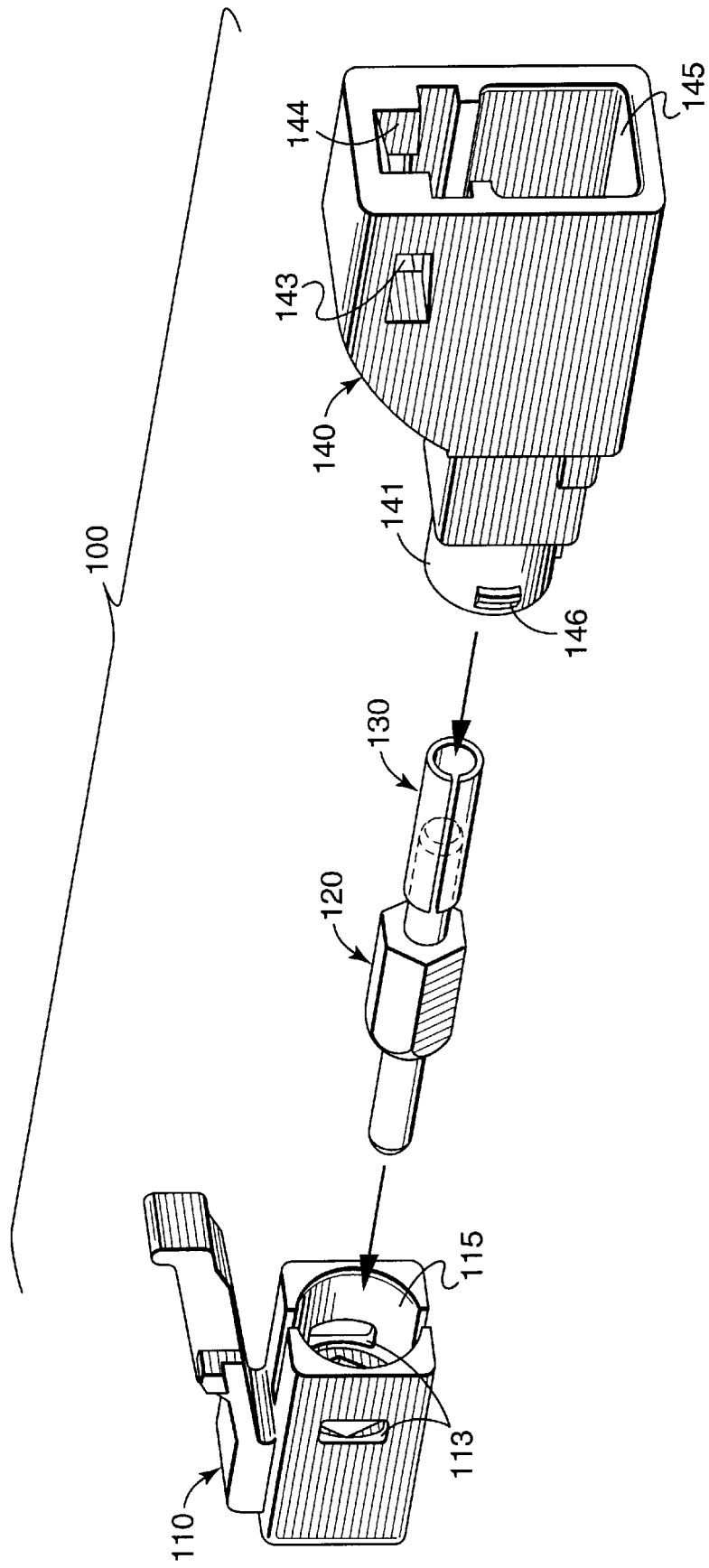
FIG. 2 shows an exploded perspective view of the optical adapter of FIG. 1 as seen from its back end.
Figure 3:
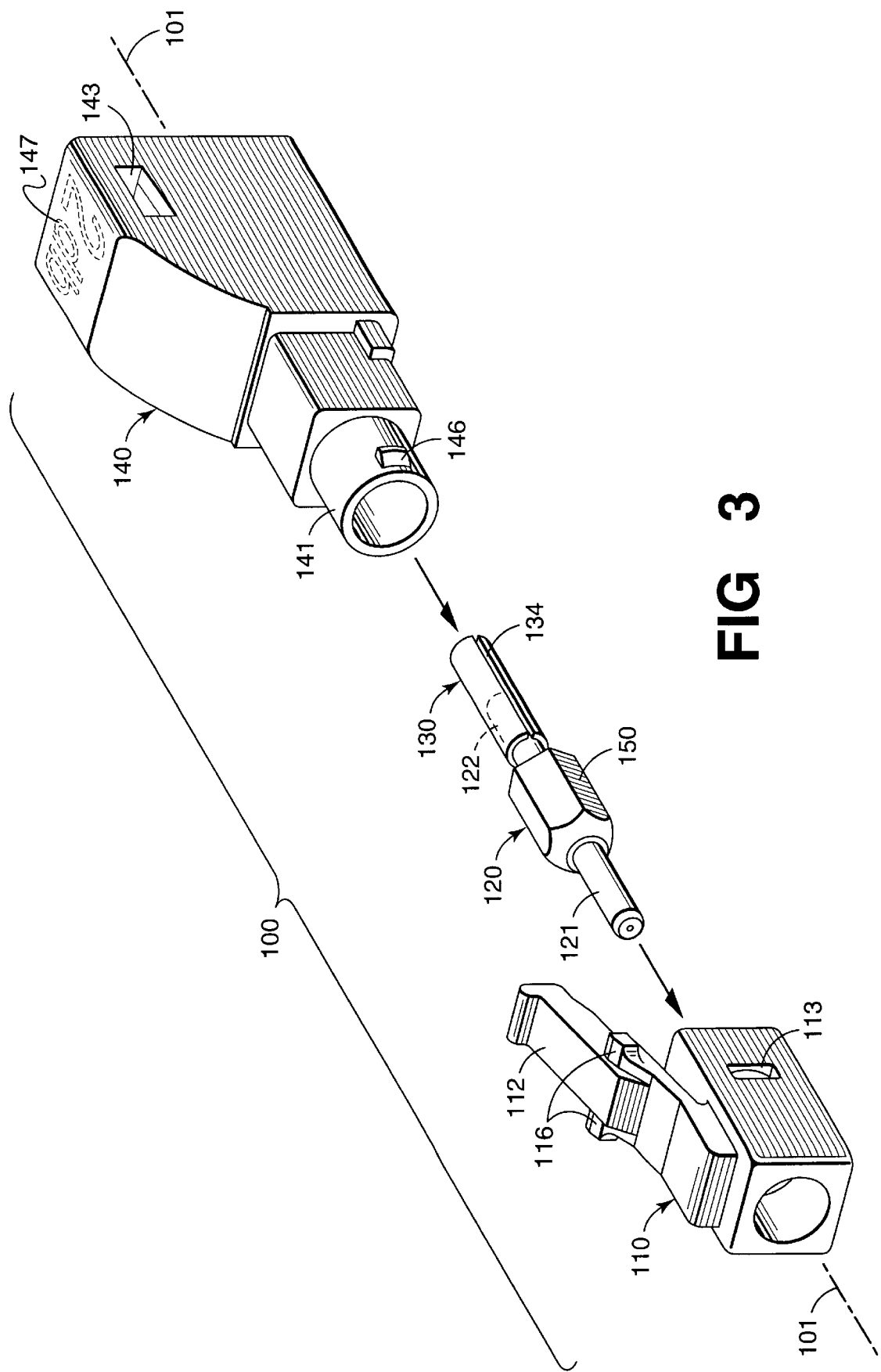
FIG. 3 shows an exploded perspective view of the optical adapter of FIG. 1 as seen from its front end.
Figure 4:
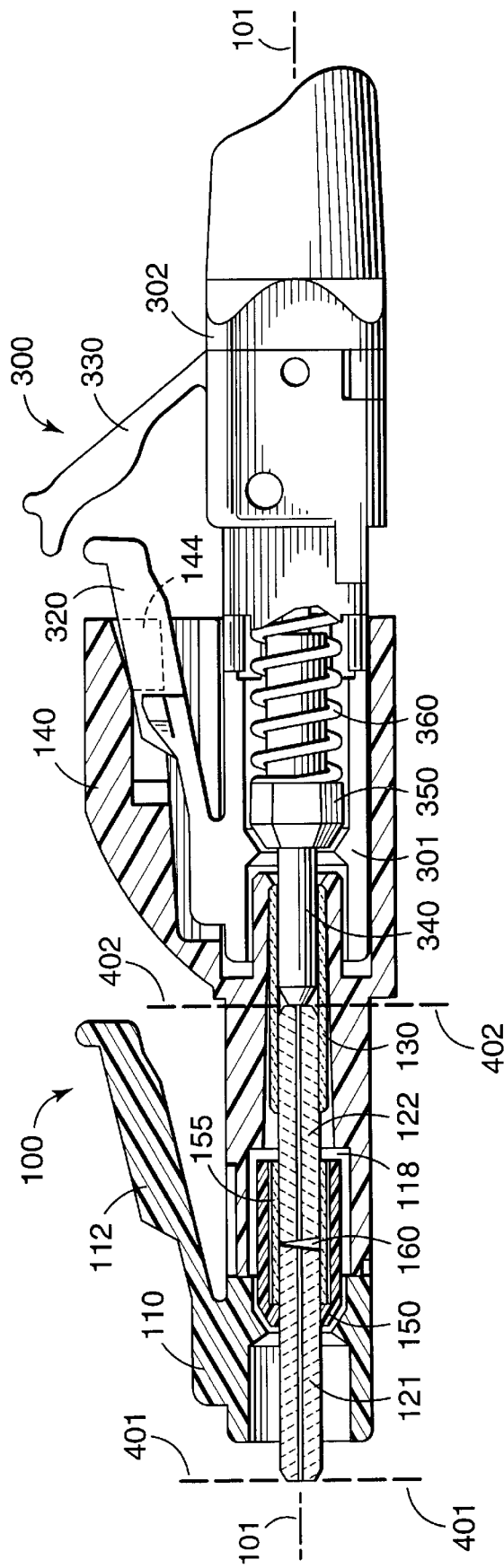
FIG. 4 shows a cross-section view of the interconnection between an optical connector and the optical adapter.

FIGS. 2–4 disclose the design of an optical adapter 100 that is suitable for containing various different ferrule assemblies, which can facilitate the construction of an optical transmission system. For example, one ferrule assembly 120 can provide a specific amount of attenuation of a lightwave signal, as discussed herein, so that optical multiplexing and demultiplexing operations can be carried out with great precision. Another ferrule assembly (not shown) can be used to interconnect optical connectors having different-size ferrules. These and other possibilities are enabled by the disclosed design.

Reference is specifically made to FIGS. 2, 3 that show exploded perspective views of optical adapter 100 as seen from its back and front ends respectively. The adapter 100 includes a ferrule assembly 120, which is captured within a housing that comprises a plug member 110 and a jack member 140. These members interlock with each other to form a single unit. Interlocking is accomplished when a pair of tabs 146 on jack member 140 are mated with a pair of slots 113 on plug member 110. The tabs 146 are positioned on opposite sides of a tubular protrusion 141 at the front end of jack member 140; and the slots 113 are positioned on opposite sides of a tubular opening 115 in the back end of plug member 110. Preferably, the plug member and the jack member are molded from a thermoplastic material such as polyetherimide (PEI); however, since the jack member has no moving parts, it could easily be made from zinc by die casting.

The top-side surface of plug member 110 includes a movable latch 112 having a pair of shoulders 116 that cooperate with mating surfaces on an associated jack connector in order to prevent unintended decoupling between the plug member and the associated jack connector. Latch 112 is molded into the plug member 110 and includes a "living" hinge that allows it to be moved up and down in a direction which is perpendicular to a central axis 101 of the adapter 100. In this illustrative embodiment, the plug member 110 has a cross-section dimension of 4.6 by 4.6 millimeters (mm).

In a preferred embodiment of the invention, ferrule assembly 120 includes a pair of cylindrical ferrules 121, 122 that are made from zirconia and held together as a single unit by a coupling apparatus that comprises a barrel 150 and an alignment sleeve 155. Each ferrule includes an optical fiber disposed within a bore that is located on its central axis. The coupling apparatus is used for maintaining the central axes of these ferrules 121, 122 collinear, and for locking them together in a fixed axial rotation with respect to each other, and with an air gap therebetween. Preferably, the barrel 150 is made from stainless steel or nickel-plated brass and has a hexagonal cross section. The hexagonal cross section is a feature that cooperates with the interior shape of the adapter to enable the ferrules to be positioned in any one of six different stable rotational positions. Accordingly, fiber eccentricity can be tuned to minimize coupling loss (e.g., ferule assembly 120 can be rotated to position the optical fiber within ferrule 121 toward the top side of the adapter 100 when the fiber is not located precisely at the geometric center of ferrule 121). It is understood that a greater or lesser number of features can be used to change the number of stable rotational positions, and that other features such as grooves may be used to achieve the same end.

In the preferred embodiment, the ferrules 121, 122 are identical to each other and have a diameter of 1.25 mm. However, in situations where it is desirable to interconnect an ST connector to an LC connector, for example, one of the ferrules (e.g., 121) would have a 1.25 mm diameter while the other (e.g., 122) would have a 2.50 mm diameter. Indeed, a single ferrule could be fabricated having a common axial bore, but with different outside diameters at its opposite ends to accommodate the interconnection of different-size ferrules.

So that an LC-type plug connector 300 (see FIG. 1) might readily fit into the jack member 140, a suitably shaped cavity 145 is provided. Moreover, a pair of retaining ledges 144 (see FIG. 2) are provided within cavity 145 for interlocking with a latch 320 on plug connector 300. The molding of retaining ledges 144 is facilitated by openings 143 on opposite sides of jack member 140. It is noted that the top-side surface 147 of the jack member 140 is illustratively used for inscribing an indication of the amount of attenuation provided by the ferrule assembly 120 contained within the optical adapter 100.

Finally, the adapter 100 includes a sleeve 130, which facilitates end-to-end connection between ferrule 122 of the ferrule assembly 120, and ferrule 340 of the plug connector 300 (see FIG. 1). The sleeve 130 preferably includes a slit 134, which allows its diameter to vary somewhat in order to accommodate minor differences in ferrule diameters.

FIG. 4 shows a cross-section view of the interconnection between the plug connector 300 and the optical adapter 100 in order to illustrate the cooperation between the various components. These components are shown positioned as though an opposing ferrule were pressing against the front end of ferrule 121, and equilibrium was achieved at optical plane 401. In this situation, optical plane 402 is where equilibrium is achieved between ferrule 122 and ferrule 340.

Plug connector 300 includes molded plastic housing comprising front-end 301 and back end portion 302 that interlock with each other and surround a fiber holding structure, which comprises a base member 350 that is overmolded onto ferrule 340. A helical spring 360 surrounds the back end of the base member and urges it forward (i.e., toward the front end of the connector) with a predetermined force. As discussed in connection with FIG. 1, the connector includes a trigger 330 that cooperates with a latch 320 during the installation (removal) of the plug connector 300 into (out of) an associated jack connector. It is noted that an optical fiber extends along the central axis of this entire assembly except for the air-gap region 160 within adapter 100.

Adapter 100 includes a molded plastic housing comprising plug member 110, which includes a latch 112, and jack member 140 that interlock with each other and surround a ferrule assembly, which comprises a pair of ferrules 121, 122 that are surrounded by coupling apparatus 150, 155. Note that the ferrule assembly 120 is capable of longitudinal movement in a cavity formed within housing 110, 140 as illustrated by gap 118. A gap 118 is needed, for example, so that the ferrule assembly is capable of axial movement and transferring force from a plug connector, which has a spring loaded ferrule, to a plug connector that has an immovable ferrule. A gap size of about 1 mm is suitable.

Optical Attenuator

Figure 5:
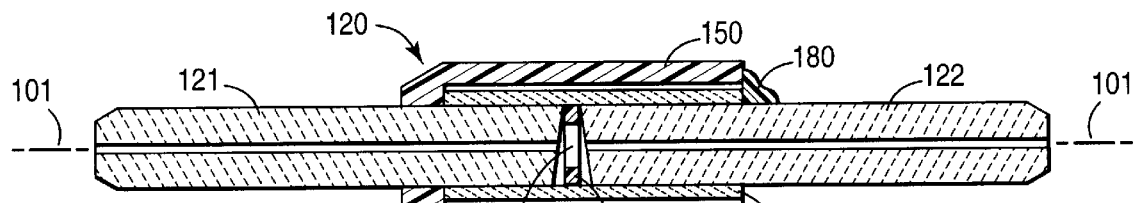
FIG. 5 shows a cross-section view of a ferrule assembly having an air-gap attenuator in accordance with the present invention.
Figure 6:
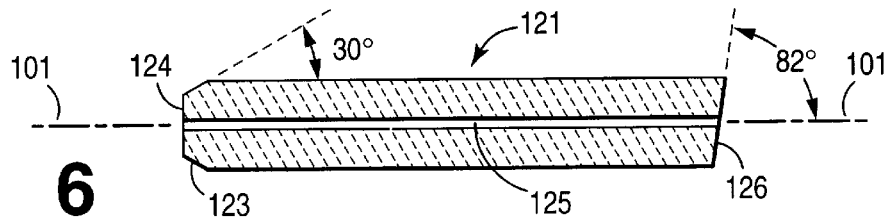
FIG. 6 discloses a cross-section view of one of the ferrules of the assembly shown in FIG. 5, illustrating selected details of its construction.

Reference is made to FIG. 5 and FIG. 6, which show details regarding the construction of an optical attenuator that includes an air-gap region 160. In particular, the attenuator is constructed using a pair of ferrules 121, 122 that are preferably, but not necessarily, identical to each other and molded from zirconia. Each ferrule includes an optical fiber that is disposed within a cylindrical bore 125 that extends between opposite end faces 124, 126 of the ferrule. These ferrules are positioned end-to-end with their central axes collinear so that lightwaves that are traveling along the optical fiber that resides on the central axis of one ferrule 121 will be directed toward the optical fiber that resides on the central axis of the other ferrule 122. Angled end face 126 may be slightly convex having a radius of between 8 and 12 mm. Because such a radius is large in comparison with the diameter of the end face (about 1.25 mm), end face 126 still has a generally flat surface. A ferrule having an end face with such a radius is called a PC (Physical Contact) ferrule. If the end face is angled as well as rounded, then it is called an APC (Angled Physical Contact) ferrule. More importantly, end face 126 forms an acute angle with respect to its central axis 101—101 and this has several consequences:

(1) the fact that the end faces of both ferrules are angled allows them to be placed in contact with each other for precise and stable control over the optical path length between the centers of the angled end faces by merely rotating one of the ferrules with respect to the other;

(2) an angled end face reduces the amount of power that traverses the air gap along the central axis because light rays emerge at the glass/air boundary at an angle described by Snell's law ($n_1 \sin \phi_1 = n_2 \sin \phi_2$). Illustratively, for an air-gap length of 0.5 mm, an end face having an 82° angle decreases the amount of power that traverses the air gap along the central axis by about 7 dB as compared to an end face having a 90° angle; and (3) an angled end face also reduces the amount of power that is reflected back toward the source of power.

Signal reflections present a serious problem in high capacity optical fiber systems because reflected power can interfere with the proper operation of lasers. In the present invention, because the optical fiber is made from glass and because attenuation is accomplished through the use of an air-gap region 160, one would expect a reflection to occur. Reflectance is a function of the index of refraction (n) of the materials at the interface as set forth in the following equation:

$$\text{Reflectance} = -10\log[(n_0 - n_1)^2/(n_0 + n_1)^2]$$

For example, in a glass-to-air interface ($n_0 < 1.0$ for air, and $n_1 < 1.47$ for glass) the reflectance is −14.7 dB, which is much too high. However, by directing the reflected optical power away from the central axis of the glass fiber, the amount of power reflected toward the source is sharply reduced. It has been found that acute angles between 79 and 85 degrees (preferably 82 degrees where reflectance is about −60 dB) with respect to the central axis 101–101 provide suitable reduction in reflected signal power. It is noted that the overall reflection includes one that occurs when lightwaves emerge from the angled end face of one ferrule where the refractive index changes from about 1.47 to about 1.0. As discussed above, this is about −60 dB; although other downstream reflections may be more significant.

As discussed above and shown in FIG. 5, ferrules 121, 122 are substantially identical to each other, and are positioned with their angled end faces 126 facing each other with an air-gap region 160 between them. In the present invention, the air separation between the angled end faces 126 is zero at one point. At the center of the air-gap region 160, the optical path length between the centers of the angled end faces 126 is controlled by the relative rotation of the ferrules 121, 122 with respect to each other, and by the thickness of a ring-shaped spacer 170 that resides within the air-gap region 160 in certain embodiments.

Figure 9:
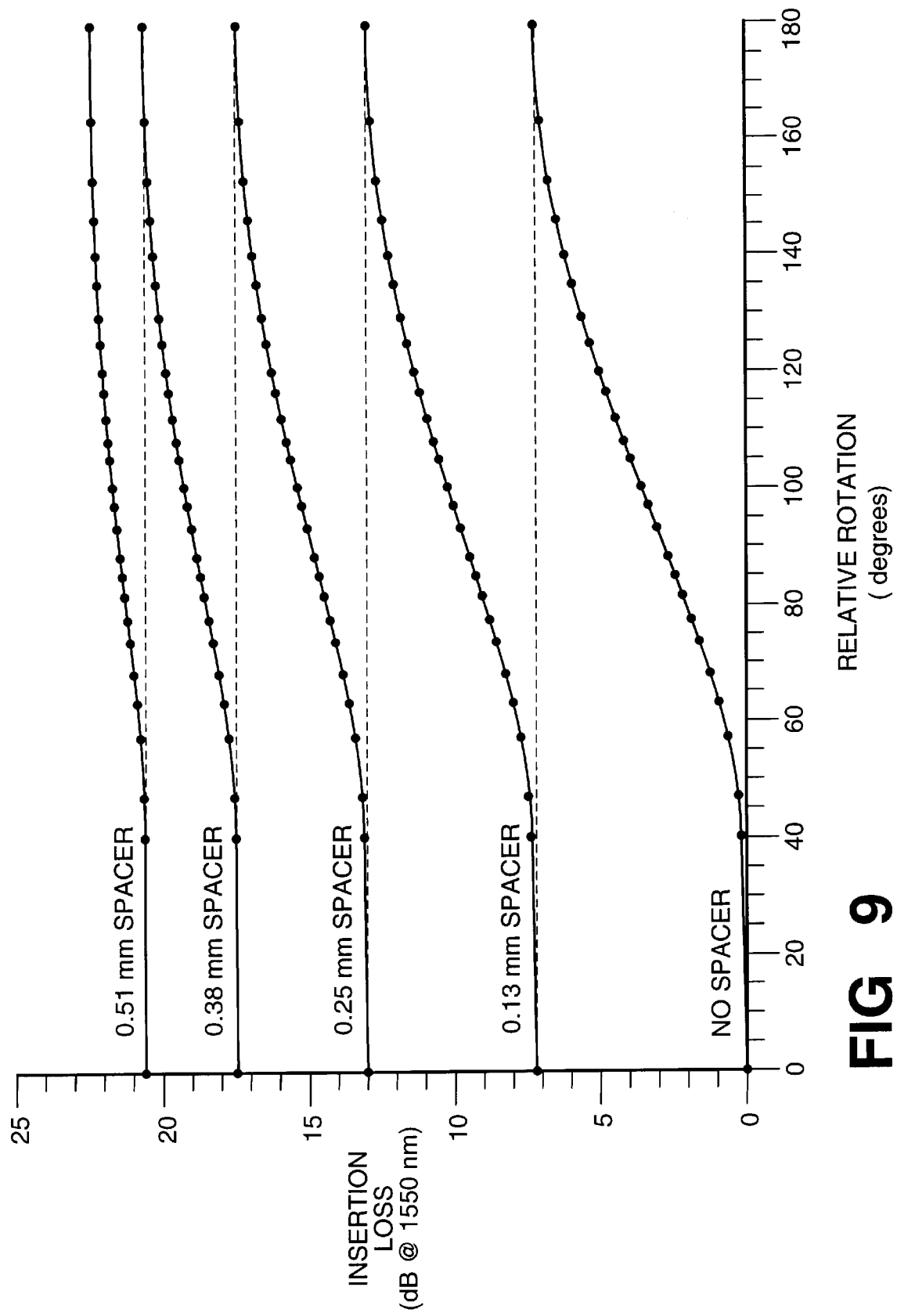
FIG. 9 shows the insertion loss characteristic of the air-gap attenuator of the present invention for different relative rotations between the ferrules, and for different spacer thickness.

In one embodiment, the angled end faces 126 of the ferrules are in direct contact with each other. Such contact improves the stability of the attenuator because it prevents the optical path length between the centers of the angled end faces 126 from ever becoming smaller as a result of handling or vibrations during actual use. In this embodiment, this optical path length is only a function of the axial rotation of the ferrules with respect to each other. See, for example the lowest curve in FIG. 9 where insertion loss varies from zero to about 7 dB as the relative rotation varies from zero to 180°. The graphs of FIG. 9 are for APC end faces (10–12 mm radius); however, for absolutely flat end faces 126, the insertion losses will be greater.

Figure 8:
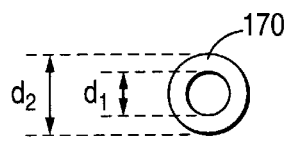
FIG. 8 discloses a ring-shaped spacer that is used in some embodiments of the air-gap attenuator.

In another embodiment, the spacer 170 is inserted in the air-gap region 160 between the angled end faces of the ferrules 121, 122 to increase the length of the air-gap region 160 by a discrete amount. Here, the angled end faces 126 of the ferrules 121, 122 are in contact with opposite sides of the same spacer 170. Such contact improves the precision of the attenuator as discussed above. Although spacer 170 is preferably a ring-shaped flat disc, as shown in FIG. 8, it is understood that other shapes are contemplated so long as they include a suitably large opening at the center for light transmission. Spacer 170 is preferably made from zirconia or stainless steel, and has an outer diameter $d_2$, which is approximately equal to the diameter of the smallest ferrule (illustratively 1.25 mm) and an inner diameter $d_1$, which allows light to be transmitted across air-gap region 160 between ferrules 121, 122 without interference (illustratively 0.5 mm). In this embodiment, the length of air-gap region 160 is a function of the axial rotation of the ferrules with respect to each other and a function of the thickness of the spacer 170. See, for example, the top four curves of FIG. 9 where insertion loss of the attenuator varies from about 7 dB (when the relative rotation is zero degrees and the spacer thickness is about 0.13 mm) to about 22 dB (when the relative rotation is 180° and the spacer thickness is about 0.50 mm).

Construction of ferrule assembly 120 illustratively proceeds by press fitting or bonding ferrule 121 into the bore at one end of barrel 150 until only a predetermined amount extends outward. One end of a cylindrical alignment sleeve 155, preferably made from zirconia, is installed onto the back end of ferrule 121. Thereafter, a spacer 170 is optionally inserted into the cylindrical sleeve alignment for those ferrule assemblies where high levels of insertion loss are sought. The back end of ferrule 122 is then inserted into the other end of alignment sleeve 155; but care is taken not to exceed a limited force (about 0.5 kgf) so that the angled end faces 126 of the ferrules 121, 122 will not be damaged. Ferrule 122 is now rotated until a desired amount of attenuation is achieved, and then epoxy 180 is applied to bond it to the coupling apparatus 150, 155. A suitable 2-part epoxy is Hysol 0151, which is commercially available from the Dexter Corporation. It is understood that the diameter of the bore through the barrel 150 can be sized to avoid the need for an alignment sleeve 155. Ferrules 121, 122 preferably include a 30° chamfer 123 at their front ends 124, which are slightly convex (e.g., with a radius between 7 and 30 mm) and may be angled.

Figure 7A:
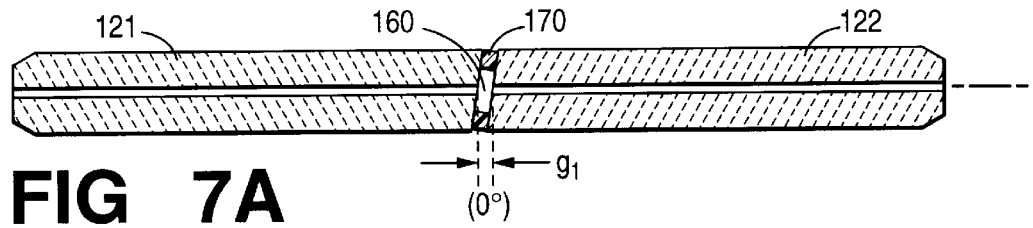
FIGS. 7A–7C show various rotational orientations of a pair of ferrules used in constructing the air-gap attenuator of the present invention.
Figure 7B:
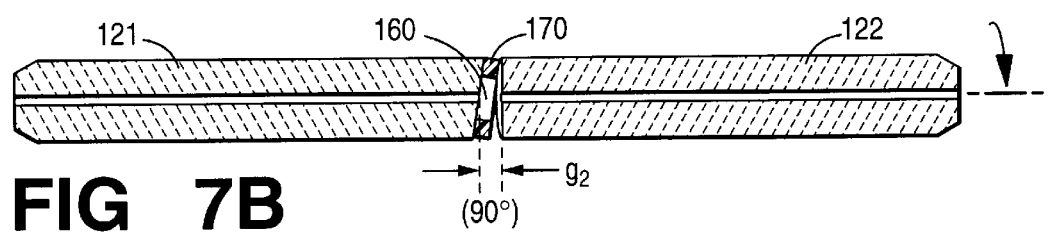
Figure 7C:
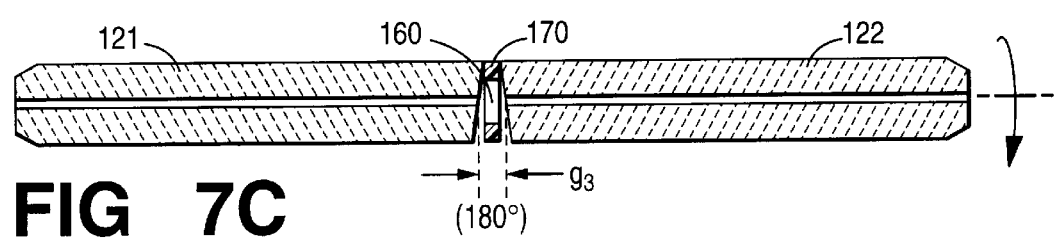

FIGS. 7A–7C show various rotational orientation of ferrules 121, 122 with a spacer 170 installed in the air-gap region 160 between ferrules. In FIG. 7A, the gap ($g_1$) between ferrule centers is equal to the thickness of the spacer 170 because the relative rotation is zero degrees and the angled end faces reside in planes that are parallel to each other. In FIG. 7B, the ferrules are rotated one-quarter turn (90°) with respect to each other which causes the length of the gap ($g_2$) between ferrule centers to be increased by about 0.05 mm over the thickness of the spacer (assuming that the ferrules each have an outside diameter of about 1.25 mm). In FIG. 7C, the ferrules are rotated one-half turn (180°) with respect to each other which causes the length of the gap ($g_3$) between ferrule centers to be increased by about 0.13 mm over the thickness of the spacer (assuming that the ferrules each have an outside diameter of about 1.25 mm).

WDM System

Figure 10:
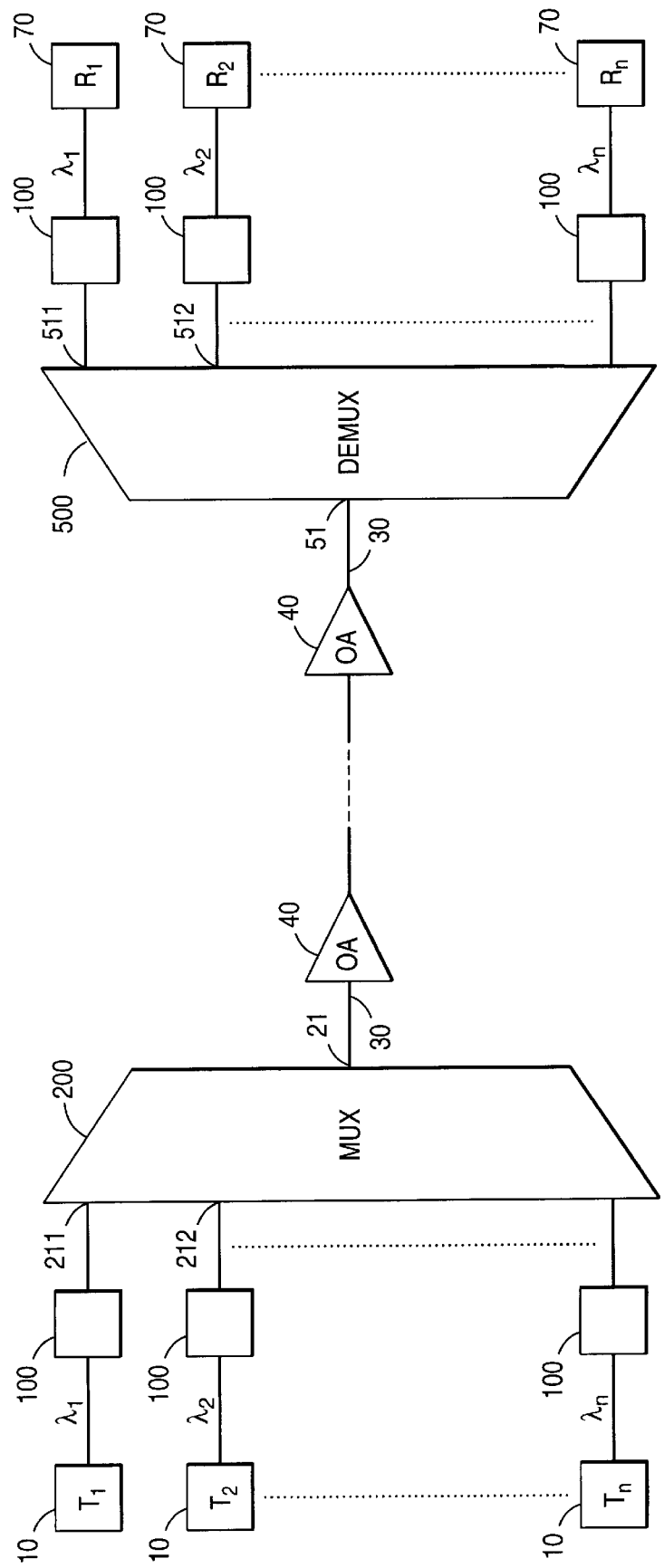
FIG. 10 discloses an optical wavelength-division-multiplexing (WDM) communication system using the air-gap attenuators of the present invention.

As optical communications advance, it is increasingly desirable to transmit more information over a single fiber. Significant advances have been made in the art of combining a number (n) of individual information channels onto the same optical fiber, where each channel comprises a different wavelength region whose central wavelength is designated $\lambda_n$. FIG. 10 discloses an optical transmission system wherein a number of transmitters 10, designated $T_1 \ldots T_n$, supply optical signals in each of n different channels to a multiplexer 200, whose job is to combine the individual optical signals on its input ports 211, 212 . . . and route them to its output port 21, which connects to an optical fiber 30. And while it is generally desirable for the optical power at each input port of multiplexer 200 to be precisely equal, it may also be desirable for the input channels to have different power levels, and optical attenuators 100 provide such control.

The optical transmission system of FIG. 10 includes a demultiplexer 500, which is linked to multiplexer 200 by optical fiber 30 and, possibly, one or more optical amplifiers 40. Demultiplexer 500 separates the individual channels that are simultaneously present on input port 51 and routes them to output ports 511, 512 . . . according to wavelength. These ports are then connected to receivers 70, designated $R_1 \ldots R_n$, which convert optical signals to electrical signals. And while it is generally desirable for the optical power at each output port of demultiplexer 500 to be precisely equal, it may also be desirable for the output channels to have different power levels, and optical attenuators 100 provide such control.

Although various particular embodiments of the present invention have been shown and described, modifications are possible within the spirit of the invention. These modifications include, but are not limited to: an adapter wherein the jack member is designed to receive an FC, SC or ST plug connector; a ferrule assembly that comprises a pair of cylindrical ferrules having different diameters; and the use of materials, other than those discussed herein, in the construction of the optical adapter.

We claim:

1. An optical adapter for interconnection between a plug connector and a jack connector, said adapter including a ferrule assembly and a housing, wherein the ferrule assembly comprises at least one cylindrical ferrule having an optical fiber disposed along its central axis between front and back portions thereof, and wherein the housing comprises:

a plug member having front and back ends and a cavity that extends therebetween, the front portion of the ferrule assembly being installed into the back end of the plug member and protruding from the front end thereof, the plug member having a cantilever latch and being adapted to fit into the jack connector;

a jack member having a cavity that extends between front and back ends thereof, the opening being adapted to receive a back portion of the ferrule assembly into the front end of the jack member, the back end of the jack member being adapted to receive the plug connector; and the front end of the jack member being interlocked to the back end of the plug member to enclose the ferrule assembly.

2. The adapter of claim 1 wherein the ferrule assembly is movable in the axial direction within the interlocked plug and jack members.

3. The adapter of claim 1 wherein the ferrule assembly further includes a structure that includes one or more features that cooperate with the cavity in the plug member to enable the ferrule assembly to have a plurality of stable axial positions.

4. The adapter of claim 3 wherein the structure comprises an elongated barrel that surrounds at least a portion of the ferrule assembly and includes a number (N) of flat surfaces that extend from one end of the barrel to the other.

5. The adapter of claim 4 wherein N=6.

6. The adapter of claim 1 wherein the plug member includes a pair of slots and the jack member comprises a pair of mating tabs, which cooperate to interlock the plug and jack members.

7. The adapter of claim 1 wherein the ferrule assembly further includes a cylindrical sleeve that surrounds the back portion of the ferrule assembly.

8. The adapter of claim 1 wherein the ferrule assembly comprises first and second cylindrical ferrules that are coaxially aligned end-to-end with an air-gap region therebetween.

9. The adapter of claim 8 wherein the first and second cylindrical ferrules are identical to each other.

10. The adapter of claim 8 wherein the first and second ferrules have end faces that face each other in the air-gap region, each end face comprising a generally flat surface that forms an acute angle with respect to its central axis.

11. The optical attenuator of claim 10 wherein the acute angle is about 82 degrees.

12. The adapter of claim 10 wherein the air separation between the angled end faces is zero at one point.

13. The adapter of claim 12 further including a coupling apparatus that surrounds the air-gap region and holds the ferrules in a fixed axial rotation with respect to each other.

14. An optical adapter for interconnection between a plug connector and a jack connector including a ferrule assembly and a housing, wherein the ferrule assembly comprises at least one cylindrical ferrule having an optical fiber that extends between front and back ends thereof along its central axis

CHARACTERIZED IN THAT the housing comprises a plug member and a jack member that interlock with each other and enclose the ferrule assembly, the jack member having a cavity for receiving the plug connector, the plug member having a cantilever latch and being shaped to plug into the jack connector.

15. The optical adapter of claim 14 wherein the plug member is molded from thermoplastic material.

16. The optical adapter of claim 15 wherein the jack member is molded from thermoplastic material.

* * * * *